United States Patent
Friend et al.

(10) Patent No.: US 9,369,507 B2
(45) Date of Patent: Jun. 14, 2016

(54) SYSTEMS AND METHODS FOR RELIABLE BACKUP OF MEDIA

(71) Applicant: Carbonite, Inc., Boston, MA (US)

(72) Inventors: David Friend, Boston, MA (US); Lars Mikkelsen, Princeton, NJ (US); Cory Mintz, Hightstown, NJ (US); James Speth, Princeton, NJ (US)

(73) Assignee: Carbonite, Inc., Newton, MA (US)

( * ) Notice: Subject to any disclaimer, the term of this patent is extended or adjusted under 35 U.S.C. 154(b) by 324 days.

(21) Appl. No.: 13/796,282

(22) Filed: Mar. 12, 2013

(65) Prior Publication Data
US 2014/0187239 A1    Jul. 3, 2014

Related U.S. Application Data

(60) Provisional application No. 61/747,568, filed on Dec. 31, 2012.

(51) Int. Cl.
*H04L 29/06* (2006.01)
*H04L 29/08* (2006.01)

(52) U.S. Cl.
CPC .............. *H04L 65/602* (2013.01); *H04L 29/08* (2013.01); *H04L 67/06* (2013.01); *H04L 69/08* (2013.01); *H04L 69/18* (2013.01)

(58) Field of Classification Search
CPC .............. H04N 21/234309; H04N 21/234363; H04N 21/2343; G06F 15/16; H04L 29/08; H04L 67/06
See application file for complete search history.

(56) References Cited

U.S. PATENT DOCUMENTS

| | | | | |
|---|---|---|---|---|
| 7,120,593 | B1* | 10/2006 | Fry | G06Q 30/06 345/600 |
| 7,526,314 | B2* | 4/2009 | Kennedy | H04M 1/7253 455/414.1 |
| 2010/0157067 | A1* | 6/2010 | Karn | H04N 1/00204 348/207.1 |
| 2010/0272010 | A1* | 10/2010 | Hicks, III | 725/131 |
| 2011/0289136 | A1* | 11/2011 | Klassen | 709/203 |
| 2012/0106835 | A1* | 5/2012 | Bernal et al. | 382/162 |
| 2012/0271880 | A1* | 10/2012 | Sachdeva | H04L 67/06 709/203 |
| 2012/0307078 | A1* | 12/2012 | Canan et al. | 709/217 |
| 2013/0041948 | A1* | 2/2013 | Tseng | H04L 67/06 709/204 |
| 2013/0144968 | A1* | 6/2013 | Berger | G06Q 50/01 709/217 |
| 2013/0166391 | A1* | 6/2013 | Blow et al. | 705/14.66 |

(Continued)

OTHER PUBLICATIONS

"PhotoSync—wirelessly transfers your photos and videos." Dec. 28, 2012.
Chua, Hazel. "Tunaverse Launches New Photo-Sharing Social Network Called Blinq." Mar. 16, 2012.
Crump, Mark. "iOS5: Photo Stream, warts and all." Oct. 13, 2011.
Grunin, Lori. "Apple Photo Stream syncs photos simply." Oct. 13, 2011.

*Primary Examiner* — Pankaj Kumar
*Assistant Examiner* — Alexander Boyd
(74) *Attorney, Agent, or Firm* — Foley & Lardner LLP; John D. Lanza

(57) ABSTRACT

The present disclosure describes systems and methods for reliable backup of data, by initially providing transcoded, down-sampled, or low resolution versions of media data files for backup when a network has low bandwidth or intermittent connectivity, and subsequently providing the original or high resolution copy to replace the transcoded version, either on a second, faster or more reliable network, or over time on the first network. Accordingly, even with poor network conditions, data may be backed up quickly in a reduced size in case of damage to or loss of the device, providing a "better low resolution than no resolution" safety margin.

20 Claims, 5 Drawing Sheets

(56) References Cited

U.S. PATENT DOCUMENTS

2014/0032718 A1* 1/2014 Berger .................... H04L 67/06
709/219

2014/0074986 A1* 3/2014 Stoop ...................... H04L 67/02
709/219

* cited by examiner

SYSTEMS AND METHODS FOR RELIABLE BACKUP OF MEDIA

RELATED APPLICATIONS

The present application claims priority to and the benefit of U.S. Provisional Patent Application No. 61/747,568, entitled "Systems and Methods for Reliable Backup of Media," filed Jan. 14, 2013, the entirety of which is hereby incorporated by reference.

FIELD

The present application relates to systems and methods for reliable backup of data via a network.

BACKGROUND

Mobile devices, such as smart phones and tablet computers, frequently include media recording capability, such as the ability take photos or record videos. As recorder technology advances, recorded data may be quite large. For example, many smart phones now include 8 megapixel (MP) cameras which may capture uncompressed high bit-depth images with file sizes in the range of 48-64 megabytes (MB). High resolution video may be significantly larger, with sizes of 400-700 MB per second, depending on bit-depth. Uncompressed media data sizes only promise to increase in the future.

However, network speeds are not keeping pace with the increase in file sizes. For example, current cellular data connections may be up to 19 megabits per second (Mbps) for an upload, and while this is likely to increase, large data files will still take significant amounts of time to transfer via such networks. Additionally, particularly in rural areas, network connectivity may be unreliable, intermittent, or via even slower legacy networks.

Online data backup services provide for remote synchronization and off-site backup of data files transmitted by remote devices, including mobile devices. However, with the above-mentioned large file sizes and slow or intermittent network connectivity, remote backup processes may take a significant amount of time to complete for each item. During this time, the device may be stolen, lost, or damaged, potentially resulting in permanent loss of the data.

SUMMARY

The present disclosure describes systems and methods for reliable backup of data, by initially providing transcoded, down-sampled, or low resolution versions of media data files for backup when a network has low bandwidth or intermittent connectivity, and subsequently providing the original or high resolution copy to replace the transcoded version, either on a second, faster or more reliable network, or over time on the first network. Accordingly, even with poor network conditions, data may be backed up quickly in a reduced size in case of damage to or loss of the device, providing a "better low resolution than no resolution" safety margin.

In one aspect, the present disclosure is directed to a method for reliable backup of media. The method includes a device capturing a first item of media at a first resolution. The method also includes determining, by the device, that a parameter of a first network connection between the device and a second device is below a predetermined threshold. The method further includes transcoding, by the device, the first item of media to a second, lower resolution, responsive to the determination that the parameter of the first network connection is below the predetermined threshold. The method also includes transmitting, by the device, the transcoded first item of media at the second, lower resolution, to the second device for storage via the first network connection. The method includes subsequently determining, by the device, that the parameter of a second network connection between the device and the second device is equal to or above the predetermined threshold. The method also includes transmitting, by the device, the first item of media at the first resolution via the second network connection responsive to the determination that the parameter of the second network connection is equal to or above the predetermined threshold. The second device may replace the stored first item of media at the second, lower resolution with the first item of media at the first resolution automatically upon receipt of the first item of media at the first resolution.

In some embodiments, the first network connection comprises a cellular connection, and the second network connection comprises a wired data connection or a WiFi connection. In other embodiments, the first network connection and the second network connection are via the same network. For example, the first network connection and the second network connection may be distinct application layer, session layer, or transport layer connections via the same data layer or physical layer connection. In one embodiment, the parameter is a bandwidth of the connection. In another embodiment, the parameter is a packet loss rate of the connection. In still another embodiment, the parameter is a remaining amount of data that may be transferred under a monthly subscription for the connection. In yet another embodiment, the parameter is a value proportional to a cost per unit of data transferred via the connection. For example, the parameter may be an inverse of a number of kilobytes or megabytes that may be transferred per dollar under a cellular subscription plan. In still other embodiments, the parameter may include any of these or other parameters.

In some embodiments, the method includes identifying a connection type of the first network connection and identifying a type of the second network connection. Determining that the parameter of the first network connection is below the predetermined threshold is based at least in part on the type of the first network connection and determining that the parameter of the second network connection is equal to or above the predetermined threshold is based at least in part on the type of the second network connection.

In many embodiments of the method, transcoding the first item of media comprises scaling the first item of media. In some embodiments, transcoding the first item of media comprises reducing a bit depth of the first item of media.

In one embodiment, the method includes storing the transcoded first item of media at the second, lower resolution until successfully transmitting the first item of media at the first resolution via the second network connection, and deleting the stored transcoded first item of media responsive to the successful transmission of the first item of media at the first resolution. In other embodiments, the second device stores the first item of media at the second, lower resolution as a thumbnail corresponding to the first item of media at the first resolution.

In another aspect, the present disclosure is directed to a method for reliable backup of media. The method includes receiving, by a device from a second device via a first network connection, a first item of media at a first resolution, the first item of media captured at a second, higher resolution and transcoded by the second device to the first resolution. The method also includes storing, by the device, the first item of media at the first resolution. The method further includes subsequently receiving, by the device from the second device via a second network connection, the first item of media at the second, higher resolution. The method also includes deleting, by the device, the first item of media at the first resolution, responsive to receiving the first item of media at the second, higher resolution.

In many embodiments, the first and second network connection may comprise the same network connection. In other embodiments, the first and second network connection may be distinct connections via the same network, such as distinct application layer, session layer, or transport layer connections via the same data layer or physical layer network. In some embodiments, the method includes determining that the received first item of media at the second, higher resolution is a higher-resolution version of the first item of media at the first resolution. In a further embodiment, the method includes comparing metadata of the first item of media at the second, higher resolution and the first item of media at the first resolution. In another further embodiment, the method includes receiving with the first item of media at the first resolution a first identifier; receiving with the first item of media at the second, higher resolution a second identifier; and comparing the first identifier and second identifier.

In some embodiments of the method, a parameter of the first network connection between the device and the second device is below a predetermined threshold, and the parameter of the second network connection between the device and the second device is equal to or above the predetermined threshold.

In still another aspect, the present disclosure is directed to a system for reliable backup of media. The system includes a device comprising a network interface, a processor executing a transcoding engine and a backup engine, and a media capture interface capturing a first item of media at a first resolution. The transcoding engine is configured for transcoding the first item of media to a second, lower resolution, responsive to a determination that a parameter of a first network connection between the device and a second device via the network interface is below a predetermined threshold. The backup engine is configured for: transmitting the transcoded first item of media at the second, lower resolution, to the second device for storage via the first network connection; subsequently determining, that the parameter of a second network connection between the device and the second device via the network interface is equal to or above the predetermined threshold; and transmitting the first item of media at the first resolution via the second network connection responsive to the determination that the parameter of the second network connection is equal to or above the predetermined threshold. The second device replaces the stored first item of media at the second, lower resolution with the first item of media at the first resolution automatically upon receipt of the first item of media at the first resolution.

In one embodiment of the system, the first network connection comprises a cellular connection, and wherein the second network connection comprises a wired data connection or a WiFi connection. In other embodiments, the first network connection and the second network connection are via the same network. For example, the first network connection and the second network connection may be distinct application layer, session layer, or transport layer connections via the same data layer or physical layer connection. In another embodiment of the system, the parameter is a bandwidth of the connection. In still another embodiment of the system, the parameter is a packet loss rate of the connection. In yet another embodiment, the parameter is a value proportional to a cost per unit of data transferred via the connection.

In some embodiments, the backup engine is further configured for: identifying a connection type of the first network connection and identifying a type of the second network connection; and the determination that the parameter of the first network connection is below the predetermined threshold is based on the type of the first network connection, and the determination that the parameter of the second network connection is equal to or above the predetermined threshold is based on the type of the second network connection.

In many embodiments, the backup engine is further configured for storing the transcoded first item of media at the second, lower resolution until successfully transmitting the first item of media at the first resolution via the second network connection, and deleting the stored transcoded first item of media responsive to the successful transmission of the first item of media at the first resolution.

BRIEF DESCRIPTION OF THE FIGURES

In the drawings, like reference numbers generally indicate identical, functionally similar, and/or structurally similar elements.

DETAILED DESCRIPTION

The following description in conjunction with the above-reference drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Figure 1:
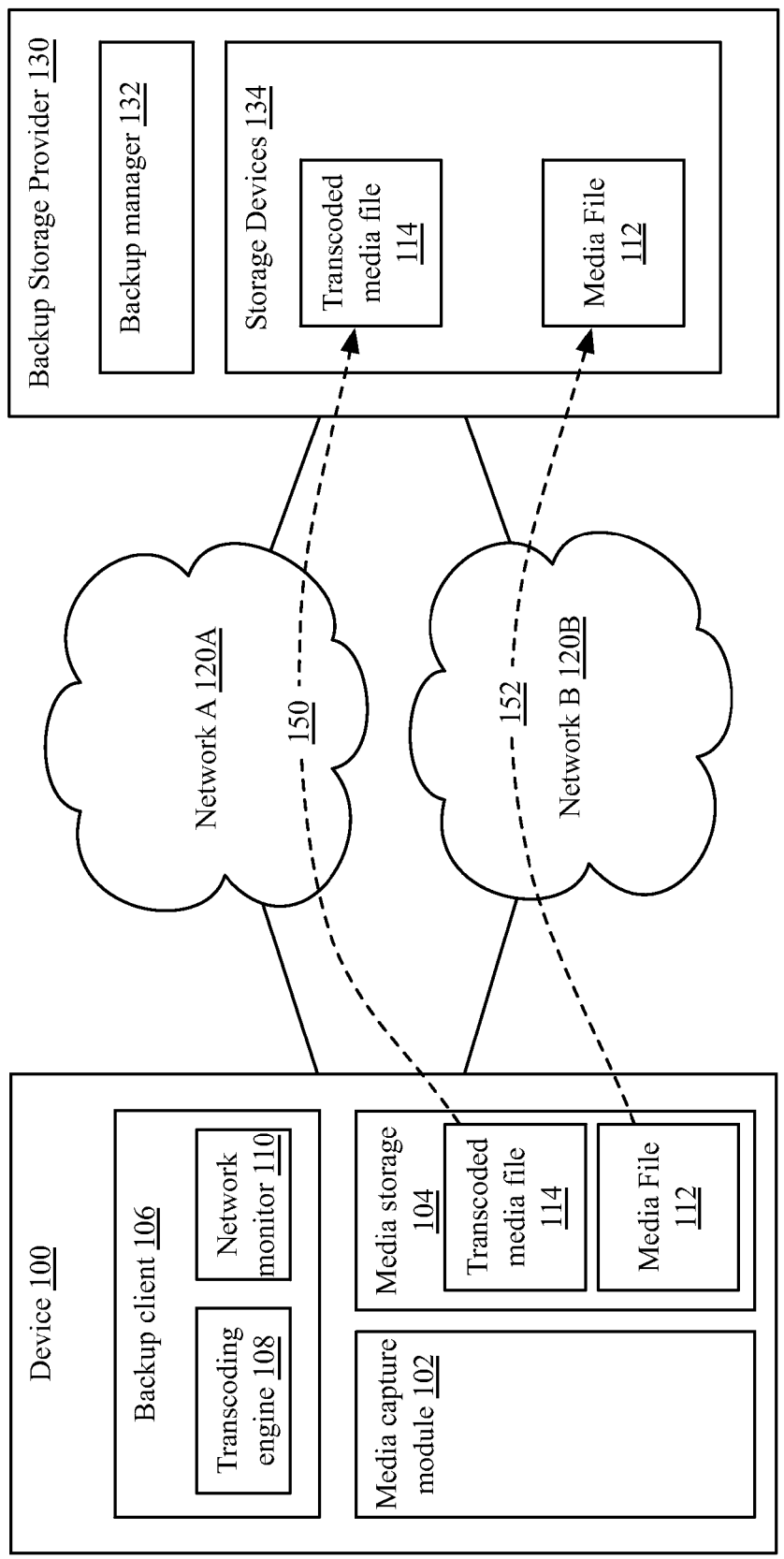
FIG. 1 is a block diagram of an embodiment of a system for providing reliable backup of media.

FIG. 1 is a block diagram of an embodiment of a system for providing reliable backup of media. In brief overview, a first device 100 may connect via a first network A 120A to a backup storage provider 130 for backup of a transcoded version of a media file 114 (dotted line 150). Subsequently, the first device 100 may connect via a second network B 120B to the backup storage provider 130 for backup of an original version of the media file 112 (dotted line 152). The backup storage provider 130 may replace the backed up transcoded version of the media file 114 with the backed up original version of the media file 112. If device 100 is lost, damaged, or otherwise unable to transmit the original version of the media file 112, the online storage provider 130 will still have the transcoded version of the media file 114 available for archival, retrieval, and synchronization to one or more additional devices (not illustrated).

Still referring to FIG. 1 and in more detail, a device 100 may comprise any type and form of computing device, including a smart phone, a tablet computer, a laptop computer, a desktop computer, or any other type and form of computing device. For example, the device 100 may be any version of an iPhone smart phone, manufactured by Apple, Inc. of Cupertino, Calif.; any version of an Android operating system-based smart phone, such as a Galaxy smart phone manufactured by the Samsung Electronics Co. Ltd. of South Korea or a Droid smart phone manufactured by HTC Corporation of Taiwan; any version of a Surface tablet manufactured by Microsoft Corp. of Redmond, Wash.; or any other device by these or other manufacturers. As discussed in more detail in connection with FIG. 4, the device 100 may include one or more processors, one or more memory elements, and one or more network interfaces including cellular, WiFi, BlueTooth, or wired connection interfaces such as USB or Ethernet.

The device 100 may include or communicate with a media capture module 102. Media capture module 102 may comprise a still or video camera, microphone, or other interface for capturing or recording a media file 112, which may comprise audio, video, still images, graphics, or any combination of these or other elements. In some embodiments, media capture module 102 may be integrated in the device 100, such as a smart phone camera or video conference camera and microphone of a laptop. In other embodiments, media capture module 102 may be separate and connected to the device 100, such as a portable video camera, web camera, or similar device. In still other embodiments, media capture module 102 may be in a separate device. For example, device 100 may be a laptop computer and a user may take photos with a second device, such as a smart phone or digital camera. The user may transfer the photos from the second device to device 100 for backup to backup storage provider 130. In still other embodiments, the media capture module 102 may refer to any input device connected to the device 100 or connected to a second device in communication with device 100. For example, media capture module 102 may include a touch screen or capacitive or resistive tablet, such as those used by graphic artists to create images. Accordingly, in some embodiments, a device 100 may record media (e.g. via a camera, microphone, instrument pickup, or other such device); generate media (e.g. via an image editing or rendering program, music synthesis application, or similar such programs); or may receive media from another device (e.g. via a smart card reader, USB connection to another device, or any other interface).

Media may be stored in a media storage 104, which may comprise any type and form of memory storage. For example, media storage 104 may comprise internal flash memory of device 100, removable flash memory such as compact flash memory, a hard drive, an optical drive, or any other type of storage device. Although shown internal to device 100, in some embodiments, media storage 104 may be external, such as an external hard drive. In still other embodiments, media storage 104 may be accessed via a third network (not illustrated), such as a network storage device on a local area network (LAN).

Media files 112 may comprise any type and form of media, include still images, video, audio, rendered graphics, or any combination of these or other data. Media files 112 may be stored in raw or uncompressed data formats, including raw image or video files or digital negatives (DNG files) or uncompressed audio bitstream formats (e.g. Waveform Audio File Format (WAV) or Audio Interchange File Format (AIFF)) or any other such formats. Media files 112 may also be stored in compressed data formats, such as those promulgated by the Motion Picture Experts Group (MPEG) including MPEG-1 Layer 3 (MP3) audio files or MPEG-4 video files; those promulgated by the International Telecommunication Union (ITU) including H.264; proprietary or non-proprietary formats including Apple Lossless Encoding (ALE) format or the open source Ogg Vorbis or Theora formats; or any other type and form of data format. Media files 112 may be recorded, generated, rendered, or otherwise created, and may be collectively referred to as captured media files.

Transcoded media files 114 may comprise any type of down-sampled, scaled, compressed, encoded or re-encoded, format-shifted, resolution-reduced, or otherwise data size reduced media files 112. For example, a media file 112 may comprise an uncompressed RAW image file, and a transcoded media file 114 may comprise a Portable Network Graphic (PNG) format compressed version of the media file 112. In other embodiments, a media file 112 may comprise a 30 frame per second (30 fps) video and a transcoded media file 114 may comprise a 15 fps version of the video. In still other embodiments, a media file 112 may comprise a 1600 by 1200 pixel image and a transcoded media file 114 may comprise a 320 by 240 pixel version of the image. Transcoding a media file 112 to a transcoded media file 114 format may accordingly comprise one or more of: rescaling an image or video; compressing an image, video, or audio file; reducing a bit depth of an image, video, or audio file; reducing a frame rate and/or sample rate of a video or audio file; filtering or normalizing an image, video, or audio file; flattening layers of an image or video file; down-mixing tracks of a multi-track audio file; cropping an image or video file; re-encoding an image, video, or audio file from a first format to a second format having a higher compression rate; or otherwise modifying a file to reduce its data size.

A device 100 may comprise or execute a backup client 106. Backup client 106 may comprise an application, service, server, daemon, routine, widget, process, or other executable logic for transcoding media files 112 into transcoded media files 114 and transmitting or synchronizing files 112, 114 via a network 120 for backup. In some embodiments, a backup client 106 may comprise a file system watcher or file system monitor to detect capture or generation of a media file 112. For example, backup client 106 may monitor file system operations involving media storage 104, may hook or intercept application requests to write to media storage 104, or may directly monitor operations of an application such as photo or video capture application.

In many embodiments, a backup client 106 may comprise or execute a transcoding engine 108. Transcoding engine 108 may comprise an application, service, server, daemon, routine, process, or other executable logic for transcoding media 112 from a first format into a second format 114. As discussed above, transcoding may comprise scaling, compressing, encoding or re-encoding, cropping, or performing any combination of these or other operations to reduce a file size for transfer. In many embodiments, transcoding may be lossy, with the resulting data file reduced beyond the capability of a lossless transcoding operation. Transcoding may, in some embodiments, be referred to as transrating or transcoding to a lower bitrate; transsizing, or transcoding to a smaller size; or other such operations. In many embodiments, transcoding may comprise decoding a compressed or encoded file to an interim uncompressed format, editing the uncompressed file, and re-compressing or encoding the file.

In many embodiments, backup client 106 may comprise, execute, or communicate with a network monitor 110. Network monitor 110 may comprise an application, service, server, daemon, routine, process, or other executable logic for detecting, identifying, and/or monitoring one or more network parameters of a network 120A-120B (referred to generally as network(s) 120). A network 120 may have several parameters that can affect transmission time of a file 112 to a backup storage provider 130 or other device, including: network bandwidth, latency, maximum transmission unit (MTU) size, signal to noise ratio, channel number, or other such characteristics. Additionally, the network 120 may have parameters that may be determined over time, including packet loss rate or error rate, connection drop rate, or other such characteristics. Accordingly, a network monitor 110 may comprise functionality for monitoring one or more of these characteristics, either instantaneously based on connection parameters or over time for parameters that are averaged over a duration. Network monitor 110 may compare the one or more parameters or characteristics of a connection 120 to a corresponding one or more thresholds to determine whether the backup client 106 should transcode the media file 112 and transmit the transcoded version of the file 114 via the connection. For example, if a connection has a bandwidth over a first threshold, the network monitor 110 may determine that the original file 112 may be transmitted without first transcoding the file 114. Conversely, if a connection has an error rate over a second threshold, the network monitor 110 may determine that the original file 112 should be transcoded and the transcoded version sent via the connection. Multiple thresholds may also be applied. For example, the network monitor 110 may determine to transcode a file if the connection bandwidth is less than 10 MB/s, the error rate is greater than 0.1, the average number of retransmissions required is greater than 2, and the latency is greater than 200 ms. Depending on parameter, the network monitor 110 may decide that a connection is "good" or capable of reliable transmission if the parameter is above a threshold (e.g. bandwidth above a predetermined threshold), or may decide that a connection is capable of reliable transmission if the parameter is below a threshold (e.g. packet loss rate below a predetermined threshold). One of skill in the art may readily appreciate that a preferred comparison of parameter and threshold may either have the parameter "above" the threshold or "below" the threshold, depending on the parameter and threshold. In some embodiments, negative thresholds (i.e. parameter-threshold combinations in which the preferred value is below the threshold, rather than above the threshold, such as packet loss rate) may be mathematically reversed, such as by using negative values or by subtracting the parameter value from a predetermined value, such that the thresholds may be treated as positive thresholds. Accordingly, in such embodiments, a preferred value for a parameter may always be considered to be "above" the threshold, with some parameters and thresholds reversed. Thus, in many embodiments, a value being "above" a threshold may refer to the value being in a preferred relationship to the threshold indicating that network performance is fast, reliable, secure, or otherwise capable of transmission of the media file 112, regardless of the actual value and threshold value mathematical relationship.

In some embodiments, thresholds may be modified based on the data to be transmitted. For example, in one such embodiment, if a connection has an average uptime of 60 seconds before being dropped and needing to be reestablished, and a bandwidth of 100 kB/second, the network monitor 110 may identify a dynamic threshold of, for example, 3 MB. If a file 112 is smaller than this dynamic threshold, the network monitor 110 may transmit the original file, on the grounds that the file may be successfully transmitted before the connection will likely drop. In other embodiments, the network monitor 110 may determine to transcode the file and transmit the transcoded version first in any embodiment in which transcoding the file will take less time than transmitting the original file. For example, if the network bandwidth is 100 kB/second, and it takes 1 second to transcode a 10 MB file, the network monitor 110 may identify that transcoding and transmitting the transcoded file will take less time than transmitting the original file, and may accordingly perform such transcoding and transmitting steps.

In some embodiments, network monitor 110 may determine to only transmit the transcoded version 114 of a file if a network connection 120A has one or more parameters below one or more corresponding thresholds, and may wait for a second connection 120B to have parameters above the thresholds to transmit the original file 112. In other embodiments, device 100 may transmit the transcoded file 114 via the connection 120A first, and then begin transmission of the original file 112 via the same connection 120A. For example, a smart phone may first transcode a newly captured photo to a smaller size and transmit the transcoded photo to a backup storage provider 130 via a cellular connection 120A. Subsequently, the smart phone may transmit the original photo at full size to the backup storage provider 130 via the same connection 120A. If transmission is interrupted or if the smart phone is damaged or lost in the interim, the user will still have the transcoded version safely backed up. Eventually, the original version of the photo will also be backed up, too, even via the same connection. Accordingly, even if the user never connects to a second network connection 120B, the original file will eventually be backed up in such embodiments.

In some embodiments, backup client 106 may prioritize transfers of transcoded media files 114 over original versions of media files 112. For example, in one embodiment, if a backup client 106 is in process of transmitting an original file of a large movie file 112A (not illustrated) to a backup storage provider 130 and a user takes a photo 112B (not illustrated), the backup client 106 may interrupt or pause the transfer of file 112A. The backup client 106 may transcode photo 112B into a transcoded file 114 and transmit the transcoded file to a backup storage provider 130. Once transmission of the transcoded file 114 is complete, the backup client 106 may resume or restart transmission of the movie file 112A. In a further embodiment, the backup client 106 may prioritize transcoded files 114 over media files 112, and may prioritize smaller files 112 over larger files 112. For example, the backup client 106 may interrupt transfer of a large movie 112A to transcode and transmit a newly captured and transcoded photo 114; then transmit the original photo 112B; and finally resume or restart transfer of the movie 112A. Accordingly, the backup client 106 may ensure that at least low-resolution or transcoded versions of files are backed up, that smaller files or as many files as possible are completely backed up, and then finally that all files are backed up.

In a still further embodiment, backup client 106 may override such transfer interruptions if the remaining time or amount to transfer of a large file is below a predetermined amount. For example, if a backup of a movie file is at 99%, it may be more efficient to complete the backup before transferring other files. Thresholds may be set based on remaining data to be transferred, bandwidth of the connection, average uptime of the connection, or any other such parameters.

A device 100 may communicate with a backup storage provider 130 via one or more connections 120. A connection 120 may comprise a wired connection, such as an Ethernet connection, a USB connection, a Firewire connection, or any other type and form of wired connection, including serial or parallel interfaces, such as Thunderbolt, Lightpeak, Lightning, or any other such proprietary or non-proprietary interfaces. Connections 120 may comprise wireless connections, including WiFi such as any variety of 802.11a/b/g/n/ac, Blue- Tooth, cellular data including Edge, 3G, 4G, CDMA, or any other type and form of wireless connection. Connections may directly connect device 100 and storage provider 130, or may connect the devices via one or more networks including local area networks (LANs), or wide area networks (WANs) such as the Internet. In some embodiments, a device 100 may be able to connect via a plurality of networks of different types simultaneously or sequentially, such as a cellular network and a WiFi network. In some embodiments, the device 100 may connect to backup storage provider 130 via a tunneled connection, encrypted connection, or virtual private network (VPN) connection. For example, in one embodiment, the device 100 may connect via a first connection encapsulated at the session layer of the OSI model by a second connection.

As discussed above, a connection 120 may have one or more characteristics or parameters, including connection type (e.g. cellular, WiFi, wired Ethernet, USB, etc.); connection speed or bandwidth, both for uploads and downloads; connection latency or delay; number of hops between the device 100 and the backup storage provider 130; signal strength; signal to noise ratio; block error rate; packet loss rate; average number of retransmissions required for packet loss; data or network layer protocol; MTU size; average connection uptime; or any other such characteristics. In some embodiments, characteristics or parameters may also include capabilities of the devices and intermediary devices, including compression, flow monitoring, prioritization, encryption, TCP Selective Acknowledgements (TCP-SACK), congestion recovery protocols, or any other such parameters or functionality. In still other embodiments, characteristics or parameters may include an amount of data remaining on a service provider subscription, such as an amount of data remaining on a monthly data limit of a cellular subscription plan. As discussed above, by comparing these connection parameters or characteristics to thresholds, which may be predetermined or dynamic, a network monitor 110 or backup client 106 may determine whether the network has sufficient bandwidth to transmit a non-transcoded, high resolution or original item of media 112 quickly, or whether the backup client 106 should transcode the media file and transmit the transcoded media file 114. In such embodiments, the network 120 may be referred to as correspondingly capable or not capable of delivering the media file 112. However, although described as not capable, a network 120 may still be able to deliver the media file 112, eventually and perhaps with occasional restarts or interruptions. As such, the term not capable should not be interpreted as excluding successful transmission forever, but rather that the network is not capable of quick, reliable delivery of the media file 112. As discussed above, in other embodiments, backup client 106 may always transcode the media file and transmit the transcoded version, regardless of network capability. In a similar embodiment, backup client 106 may transcode any media file 112 above a predetermined size and transmit the transcoded version, regardless of network capability.

A backup storage provider 130 may comprise any type and form of computing device or devices, including one or more workstations, desktop computers, laptop computers, rackmount servers, desktop servers, or a mix of these or other devices. Although shown as a single device, in many embodiments, a backup storage provider 130 may comprise a server farm or server cloud, and may comprise a plurality of devices with load balancing and distribution to act as one device. Backup storage provider 130 may include one or more physical machines and/or may include one or more virtual machines executed by one or more physical machines. Backup storage provider 130 may thus comprise one or more processors, one or more memory elements, and one or more network interfaces, specific examples of which are discussed below in connection with FIG. 4.

Backup storage provider 130 may comprise or execute a backup manager 132. Backup manager 132 may comprise an application, server, service, daemon, routine, process, or other executable logic for receiving and managing storage of media files 112 and transcoded media files 114. Backup manager 132 may communicate with or manage one or more storage devices 134, which may be configured to work separately or together, such as redundant arrays of independent disks (RAID arrays) or other directly connected or network accessible storage devices. Backup manager 132 may perform other backup related functions, including notification of receipt of and/or transmission of newly received or updated files to one or more additional devices (not illustrated); control of sharing or synchronization policies among a plurality of devices and/or users; long term archival to non-volatile or more stable media; or other such features.

As shown, storage devices 134 may receive and store transcoded media files 114 and media files 112 from a device 100, via a plurality of networks 120A-120B or via the same network sequentially. For example, having determined that a network A 120A has one or more parameters below predetermined thresholds, backup client 106 may transcode a media file 112 to create a smaller transcoded media file 114. Backup client 106 may transmit a transcoded media file 114 via network 120A at step 150 to backup storage provider 130. Backup manager 132 may save the transcoded media file 114 to storage device 134 as shown.

Subsequently, in some embodiments, device 100 may connect to a second network 120B which may have parameters above predetermined thresholds, as discussed above. Backup client 106 may identify the second network 120B as being sufficiently fast, reliable, or otherwise capable, and may transmit the media file 112 to backup storage provider 130 at step 152. In other embodiments, as discussed above, device 100 may transmit the media file 112 to backup storage provider 130 via the first network 120A subsequent to successful transmission of the transcoded media file 114. Thus, even via one network, the device may quickly backup a low resolution version of the media file, and then subsequently backup the full resolution version.

Upon receipt of the original version of the media file 112, backup manager 132 may identify that the media file 112 corresponds to transcoded media file 114. In one embodiment, each of media file 112 and transcoded media file 114 may have the same name or include the same name in a portion of their names (e.g. "file_A.raw" and "file_A.png," "file_A_low_resolution.png," "file_A-low.png," or via any other such identifiers). In another embodiment, the files may have the same unique identifier or include the same unique identifier in a portion of their identifiers (e.g. ID 10000 and ID 10000-A, or ID 10000 and ID 10001). For example, the original file may have a first identifier, and the transcoded file may have the same identifier with a predetermined bit flipped, such as a most significant bit or a least significant bit. In still other embodiments, each of media file 112 and transcoded media file 114 may share similar metadata including file creation times, locations, user names, device identifiers, or other such data. In some such embodiments, backup manager 132 may identify the transcoded media version based on a smaller file size, lower bit depth, smaller dimensions, lower frame rate, or any other such implicit identifiers.

In still other embodiments, when generating the transcoded media file 114, backup client 106 may add an identifier of media file 112 into metadata of transcoded media file 114. For example, backup client 106 may explicitly include an identifier in metadata of transcoded media file 114 indicating that the file corresponds to a specific original file 112. Backup manager 132 may maintain a database of transcoded media files 114 and their corresponding specified original files 112. Such a database may be sorted in various ways to allow quick retrieval of the identification of the transcoded media file 114 based on one or more identifiers in original file 112. For example, upon receipt of transcoded media file 114 including metadata identifying corresponding file 112, backup manager 132 may generate a hash of the metadata and use the hash as an index of the database. Accordingly, upon receiving original file 112, backup manager 132 may generate another hash of the metadata and use the hash as a lookup for the database to identify the corresponding transcoded media file 114.

Similarly, in other embodiments, backup client 106 may hash data and/or metadata of media file 112 and include the resulting hash in metadata of transcoded media file 114. Upon receipt of the transcoded media file 114 and hash, backup manager 132 may add an identifier of the file 114 or a storage location of the file 114 to a database with an index corresponding to the hash. Upon receipt of the original file 112, backup manager 132 may execute a similar hash of the data and/or metadata of the received file, and use the resulting hash as a lookup to the database to retrieve the identification of the transcoded file 114 or its storage location. In another similar embodiment, backup client 106 may transmit the hash separately with transcoded media file 114, such as in a request parameter, IP protocol ID field or options field, transport layer ID field or options field, or any other header field, or in a separate file or string.

Once backup manager 132 has identified the transcoded media file 114 stored in storage devices 134 corresponding to the received media file 112, in some embodiments, backup manager 132 may overwrite or replace the transcoded media file 114 with the received media file 112. In other embodiments, backup manager 132 may store the received media file 112 separately, and may delete transcoded media file 114 upon successful receipt and storage of media file 112. In still other embodiments, backup manager 132 may not delete the transcoded media file 114, but may save it for archival purposes, for synchronization to other devices, or for other such purposes.

Figure 2:
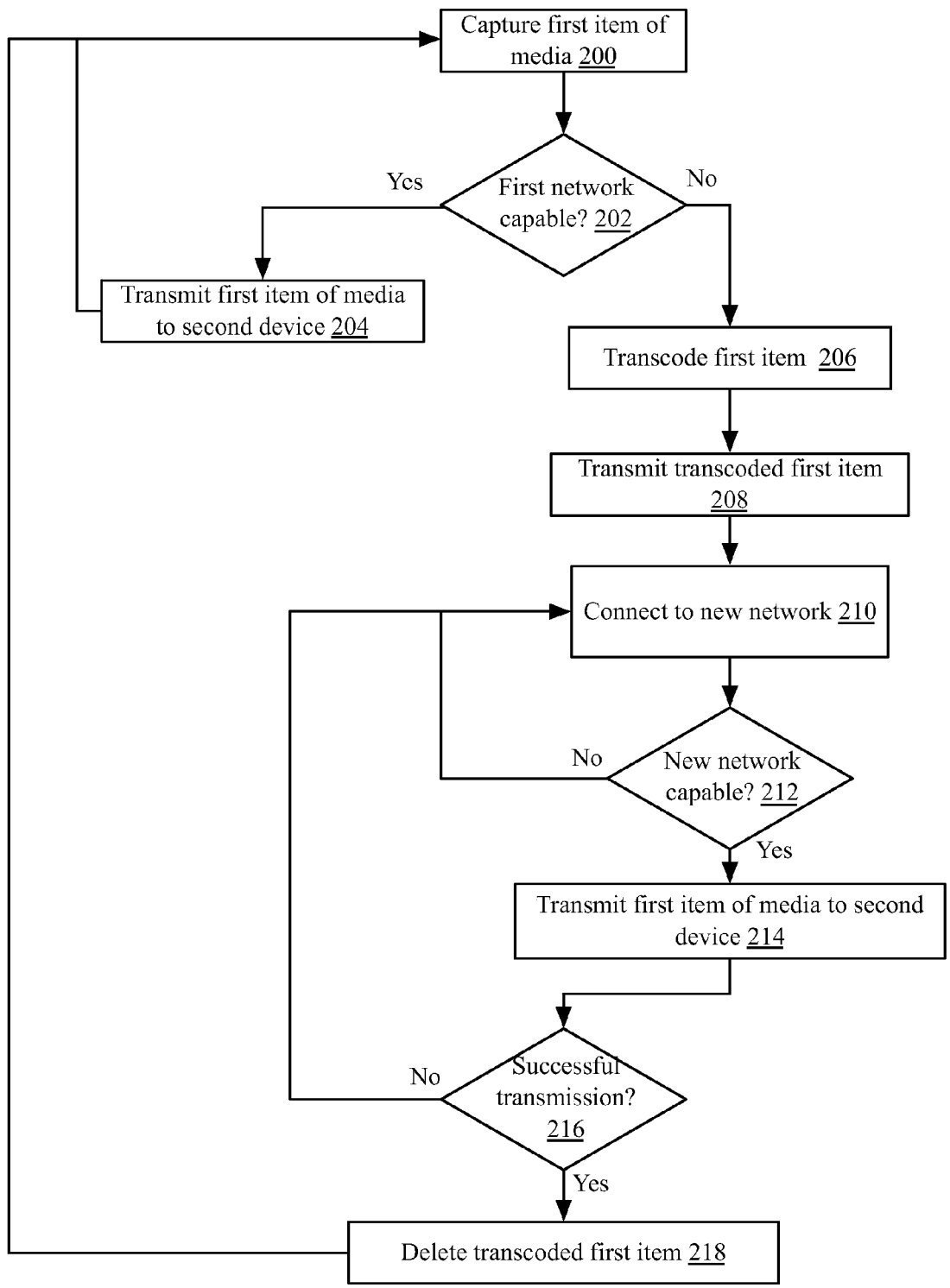
FIG. 2 is a flow chart of an embodiment of a method for reliable backup of media to a remote backup service.

Referring now to FIG. 2, illustrated is a flow chart of an embodiment of a method for reliable backup of media to a remote backup service. At step 200, a device may capture a first item of media. As discussed above, capturing a first item of media may comprise recording a video or audio file, taking a picture, generating or rendering an image or three-dimensional scene, synthesizing an audio track with a virtual instrument, or performing similar functions. Furthermore, as discussed above, capturing a first item of media may comprise receiving an item of media from a second device, such as a digital camera, voice recorder, flash memory drive, or any other such device.

At step 202, in some embodiments, a backup client executed by the device may determine if a first network between the device and a backup storage provider is capable of reliable and fast transfer of the item of media. As discussed above, determining if the network is capable may comprise identifying one or more parameters of the network, such as bandwidth, latency, average uptime, error rate, type, or any other such parameters, and comparing the one or more parameters to a corresponding one or more thresholds, which may be set statically or dynamically based on the size of the item of media. Also as discussed above, the network may be technically capable of transmitting the file successfully, but it may take a long time or require frequent restarts. As such, "capable" may refer to a network being capable of fast, reliable transfer, rather than any possible transfer. Similarly, in other embodiments, a network may be fast and capable, but a user may have a limited data plan, such as a monthly subscription cellular plan, and the user may have a limited amount of data remaining. Accordingly, while the network may be capable, the user's connection to the network may not be capable of being used, or may have an amount of data remaining less than a threshold, such that the device determines that the network should not be used. In yet still other embodiments, a network may be fast and capable of reliable transfer, but have a high cost associated with the transfer. For example, the user may have a cellular subscription plan with a high cost per megabyte uploaded. In such cases, it may be desirable to only transfer low resolution or transcoded versions of media via the cellular network, with original or higher resolution versions of the media transferred via a WiFi or wired connection. Such transfer costs may be also computed dynamically: for example, many cellular subscription plans provide a predetermined data amount for a monthly fee, with a high cost per megabyte transferred beyond the predetermined data amount. The backup client may determine if the user has already exceeded their predetermined data amount and the entire transfer will be at the increased cost, or if the user has not yet exceeded their predetermined data amount but the transfer of the high resolution version of the media would cause the user to exceed the predetermined data amount and incur additional charges. The backup client may thus dynamically determine what the cost for the transfer will be, and responsive to a user-set policy (e.g. only incur additional transfer charges up to a predetermined amount per month; never incur additional transfer charges; etc.), may determine that the connection should or should not be used to transfer the original version of the media. If the network is sufficiently fast and reliable, then at step 204 in some embodiments, the device may transmit the first item of media to a second device, such as the backup storage provider's system.

As discussed above, in some embodiments in which transcoding the item of media may take more time than transmitting the item of media or if transcoding the item of media may not significantly reduce the file size (e.g. if the item of media is a heavily compressed thumbnail image, then further compression may not be possible, and reducing the size of a thumbnail image further may result in an unresolvable picture), then the device may skip step 202 and perform step 204. In other embodiments in which a device always transcodes an item of media regardless of network capability, the device may skip step 202 and perform step 206. In other embodiments combining these embodiments, a device may determine, based on size of the first item of media and not considering network parameters, whether to transcode the item of media or not. In such embodiments, the device may always transcode items of media above a predetermined size and never transcode items of media below the predetermined size, regardless of network connection parameters.

At step 206, the device may transcode the first item of media. As discussed above, transcoding may comprise encoding the item of media into a new format, editing the item of media, scaling or cropping the item of media, down sampling or reducing a bit depth or frame rate of the item of media, compressing the item of media, or performing any combination of these or other such processing steps. In some embodiments, the device may add metadata to the transcoded first item of media identifying the original item of media, such as a hash value of metadata and/or data of the original item of media, a unique identifier of the original item of media, or any other such identifiers. In other embodiments, the device may transmit such identifiers separately or as part of a header of the transmission of the transcoded item of media. In still other embodiments, the device may determine an identifier for the transcoded item of media, such as a hash of metadata and/or data of the transcoded item of media, or a unique identifier of the transcoded item of media, and may add the identifier for the transcoded item of media to metadata of the original item of media for subsequent transmission at step 214.

At step 208, the device may transmit the transcoded item of media via the first network to a second device, such as the backup storage provider. Transmitting the transcoded item of media may comprise encrypting, compressing, or otherwise transmitting the transcoded item of media to the second device.

At step 210, in some embodiments, the device may connect to a new network. For example, the device may have been connected to a first network such as a cellular network at step 202, and may connect to a WiFi network at step 210. At step 212, the device may determine if the new network is capable of fast, reliable transmission of the item of media. If not, the device may wait until another network connection is established and repeat steps 210-212. If so, then at step 214, the device may transmit the first item of media to the second device. In other embodiments, steps 210-212 may be skipped and the device may transmit the first item of media to the second device via the first network, subsequent to transmitting the transcoded version of the item of media. Transmitting the first item of media may comprise encrypting, compressing, or otherwise transmitting the first item of media to the second device.

In some embodiments, at step 216, if transmission of the first item of media to the second device is not successful, then the device may wait for a new network connection and may repeat steps 210-216. In other embodiments, the device may simply repeat step 214 until transmission is successful. As discussed above, in some embodiments, the device may transmit an identifier for the transcoded item of media, such as a hash of metadata and/or data of the transcoded item of media, or a unique identifier of the transcoded item of media to the second device at step 214.

Once the first item of media has been successfully transmitted to the second device, in some embodiments, the device may delete the transcoded version of the first item at step 218. Similarly, the second device may, in some embodiments, delete the previously received transcoded version of the first item of media, once the first item of media has been successfully received. Accordingly, both devices may delete the low resolution or otherwise compressed version of media once the full resolution version has been successfully backed up. In other embodiments, the device may retain the transcoded version of the item of media.

Although shown for illustrative purposes describing transfer of a single item of media, the methods described above may be utilized to transfer multiple items of media. For example, in one embodiment, the first device may transcode and transmit a plurality of items of media, repeating steps 206-208 as necessary for each item of media, prior to transmitting high resolution versions of the media.

Figure 3:
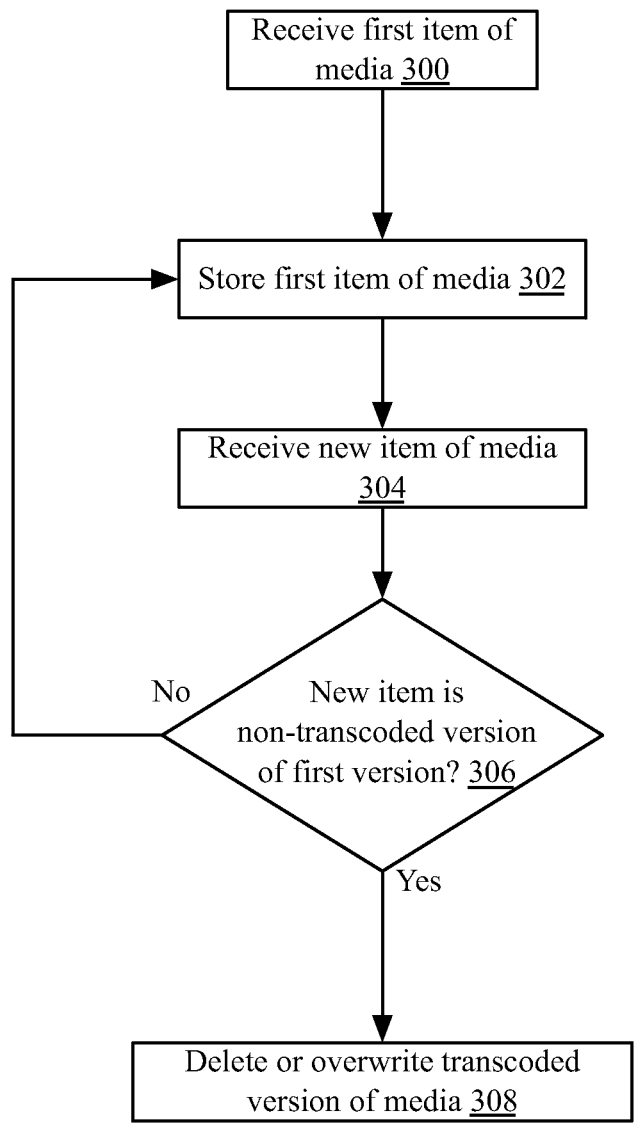
FIG. 3 is a flow chart of an embodiment of a method for reliable backup of media from a client device.

Referring now to FIG. 3, illustrated is a flow chart of an embodiment of a method for reliable backup of media from a client device. As shown, at step 300, a device, such as a backup storage provider, may receive a first version of an item of media. The first version may comprise a transcoded version of an item of media, and may be explicitly identified as such, for example by a flag, or by the inclusion of an identifier of the original version of the media, such as a unique identifier or a hash value of metadata and/or data of the original version of the media. In other embodiments, the first version may comprise a transcoded version of an item of media, but may not be explicitly identified as such.

At step 302, the device may store the first version of the media to a storage device. In some embodiments, as discussed above, the device may maintain a database identifying stored versions of media to allow identification of corresponding transcoded and non-transcoded versions of the media for replacement. Accordingly, in such embodiments, at step 302, the device may add an identification of the first version of the item of media and/or a storage location of the first version of the item of media to the database. In some embodiments, the device may store to the database an identifier of the original version of the item of media included with the transmission of the transcoded version, such as a unique identifier or hash value. In other embodiments, the device may calculate a hash of data and/or metadata of the first version of the media and may store the calculated hash to the database.

At step 304, the device may receive a new item of media. In some embodiments, the new item of media may comprise an original version of the previously received transcoded version of the media, and may be explicitly identified as such. For example, the new item of media may include in metadata or along with the transmission an identifier of the previously transmitted version of the item of media, such as a unique identifier or hash value of meta data and/or data of the transcoded version of the media. At step 306, the device may identify the corresponding transcoded version of the media via the database, such as by using the unique identifier or hash value as a lookup value for an index in the database, and may retrieve the storage location of the transcoded version of the item of media.

In other embodiments, the new item of media may comprise an original version of the previously received transcoded version of the media, but may not be explicitly identified as such. In one such embodiment in which the new item of media includes a unique identifier previously transmitted with the transcoded version of the media, at step 306, the device may search the database for the unique identifier and may retrieve the storage location of the transcoded version of the item of media. In another such embodiment in which a hash of metadata and/or data of the original version of the item of media was previously transmitted with the transcoded version of the media, at step 306, the device may calculate a hash of metadata and/or data of the received item of media, and may search the database for the corresponding hash value and may retrieve the storage location of the transcoded version of the item of media.

In still other embodiments, neither transmission of the transcoded item or the original item may comprise an identifier of the other item. In such embodiments, the device and the client device may have predetermined parameters for transcoding an item (e.g. images should be reduced to 640× 480 pixels and compressed with JPEG compression at a predetermined quality, videos should be reduced to 24 frames per second at 320×240 resolution with MPEG-4 compression at a predetermined quality, etc.). Upon receipt of each item of media, if the item of media (referred to here as "item A") does not match the predetermined parameters, the device may transcode the item of media (i.e. "transcoded item A") and calculate a hash of the resulting transcoded data. If the item of media (referred to here as "item B") does match the predetermined parameters, the device may simply calculate a hash of the data of the item of media. Accordingly, the device will end up with a hash for each item of media calculated with the same parameters (e.g. "transcoded item A" and "item B"). If the hashes match, then the non-transcoded item ("item B") must be a transcoded version of the other item of media ("item A"). In a similar embodiment, the device may use any data comparison techniques to determine if the items match or if a transcoded version of an item matches the other item.

If the new item is not an original version of the first item, then the device may store the new item for comparison to further received items, repeating steps 302-306 as necessary for each newly received item. If the new item is the original version of the transcoded first item, then at step 308 in some embodiments, the device may delete, replace, or overwrite the transcoded version. In other embodiments, as discussed above, the device may retain the transcoded version for synchronization to other devices, use as a thumbnail for quick transfer or in a file management interface, or perform other such functions.

Figure 4:
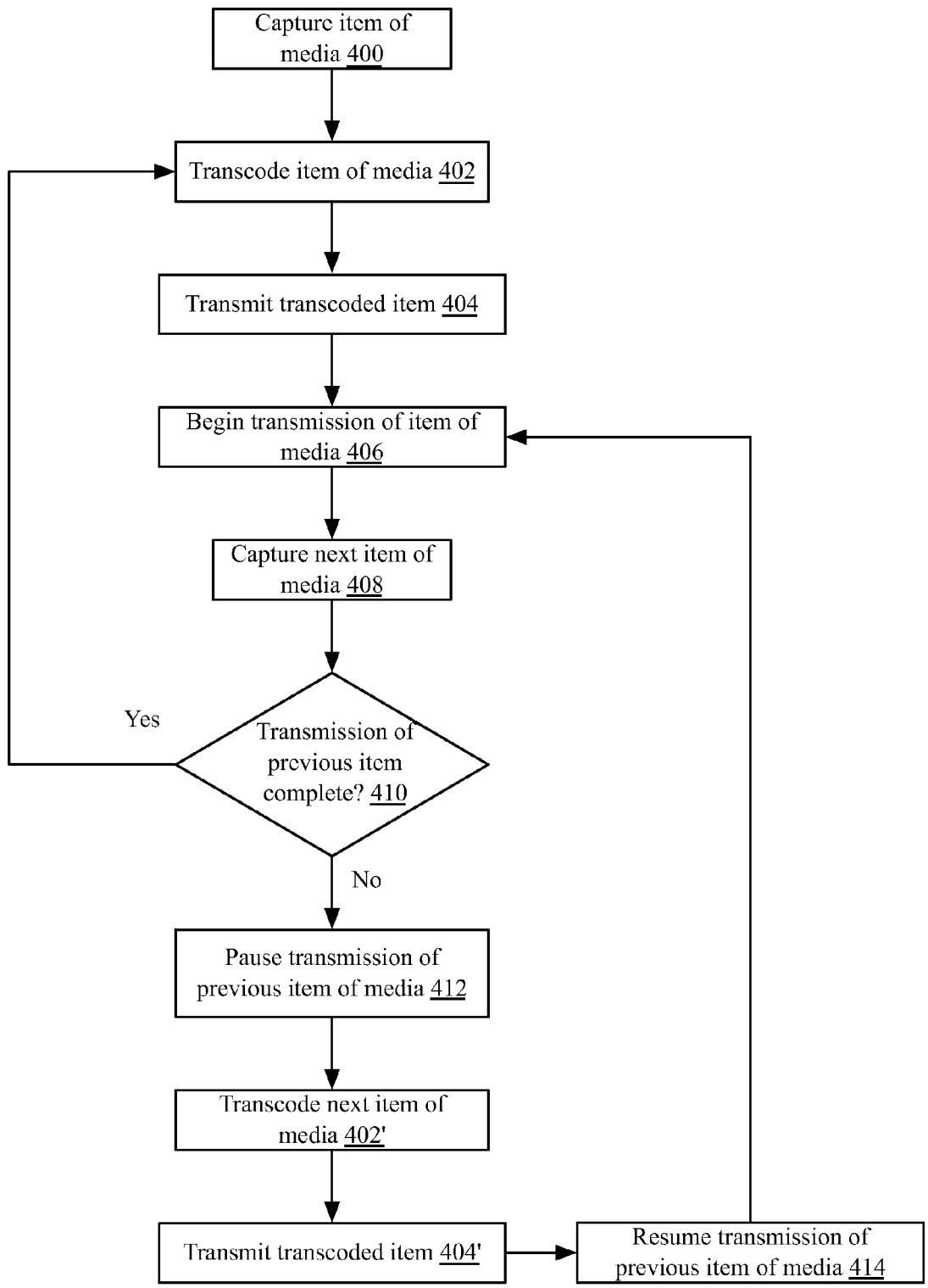
FIG. 4 is flow chart of another embodiment of a method for reliable backup of media to a remote backup service.

Referring now to FIG. 4, illustrated is flow chart of another embodiment of a method for reliable backup of media to a remote backup service, regardless of network connection parameters. At step 400, similar to step 200 as described in connection with FIG. 2, the device may capture an item of media. At step 402, similar to step 206 above, the device may transcode item of media. At step 404, similar to step 208 above, the device may transmit the transcoded item of media.

Once transmission of the transcoded item of media is complete at step 404, the device may begin transmission of the item of media to the second device or backup storage provider at step 406. As discussed above, the non-transcoded or original version of the item of media may be quite large and may take a significant amount of time to transfer. During this time, the device may capture a next item of media at step 408, similar to steps 400 and 200 above.

At step 410, the device may determine if transmission of the previous item of media is complete or substantially complete. In some embodiments, transmission is substantially complete if an amount over a predetermined threshold has been successfully transmitted, such as 85%, 90%, 95%, or 99%, or if less than a predetermined number of bytes remain to be transferred, such as 1 kB, 100 kB, or 1 MB. In other embodiments, transmission is substantially complete if a transfer time remaining is less than a predetermined threshold, such as 10 seconds, 15 seconds, or 30 seconds (this may be calculated based on the number of remaining bytes to be transferred and the average transfer rate). The transfer time remaining threshold may also be dynamically adjusted based on average connection uptime, error rates, signal level, or other such parameters.

If transmission of the previous item is substantially complete, then the device may finish transmitting the item, and then repeat steps 402-410 for the next item of media (similarly, if transmission of the previous item is complete, the device may simply repeat steps 402-410 for the next item of media). If transmission of the previous item is not substantially complete, then the device may pause transmission of the previous item of media at step 412. The device may then transcode the next item of media (step 402') and transmit the transcoded version of the next item of media (step 404'), before resuming transmission of the previous item of media at step 414. Pausing and resuming transmission of the previous item of media may be performed via various transfer protocols that allow such pausing and resumption. In other embodiments, the device may interrupt or cancel transmission of the previous item of media. This may require restarting transmission at step 414, but may be done to ensure that the transcoded version of the next item is immediately backed up at step 404'. In other embodiments, the device may not pause transmission of the previous item of media at steps 412-414, but may instead initiate a second connection to the backup storage provider and transmit the transcoded next item at step 404' via the second connection, at a higher priority. For example, the device may slow transmission of the previous item to a slow trickle of data to keep the first connection alive, while devoting almost all resources and bandwidth to transmission of the transcoded next item. Once complete, the second connection may be closed and full speed transmission of the previous item may resume. Such connections may be separate transport layer connections, or separate session or application layer connections encapsulated within the same transport layer connection.

Thus, in the method depicted in FIG. 4, newly captured items of media may be immediately backed up, albeit at a reduced quality and size, while full quality versions continue to be transmitted via the same connection.

Figure 5:
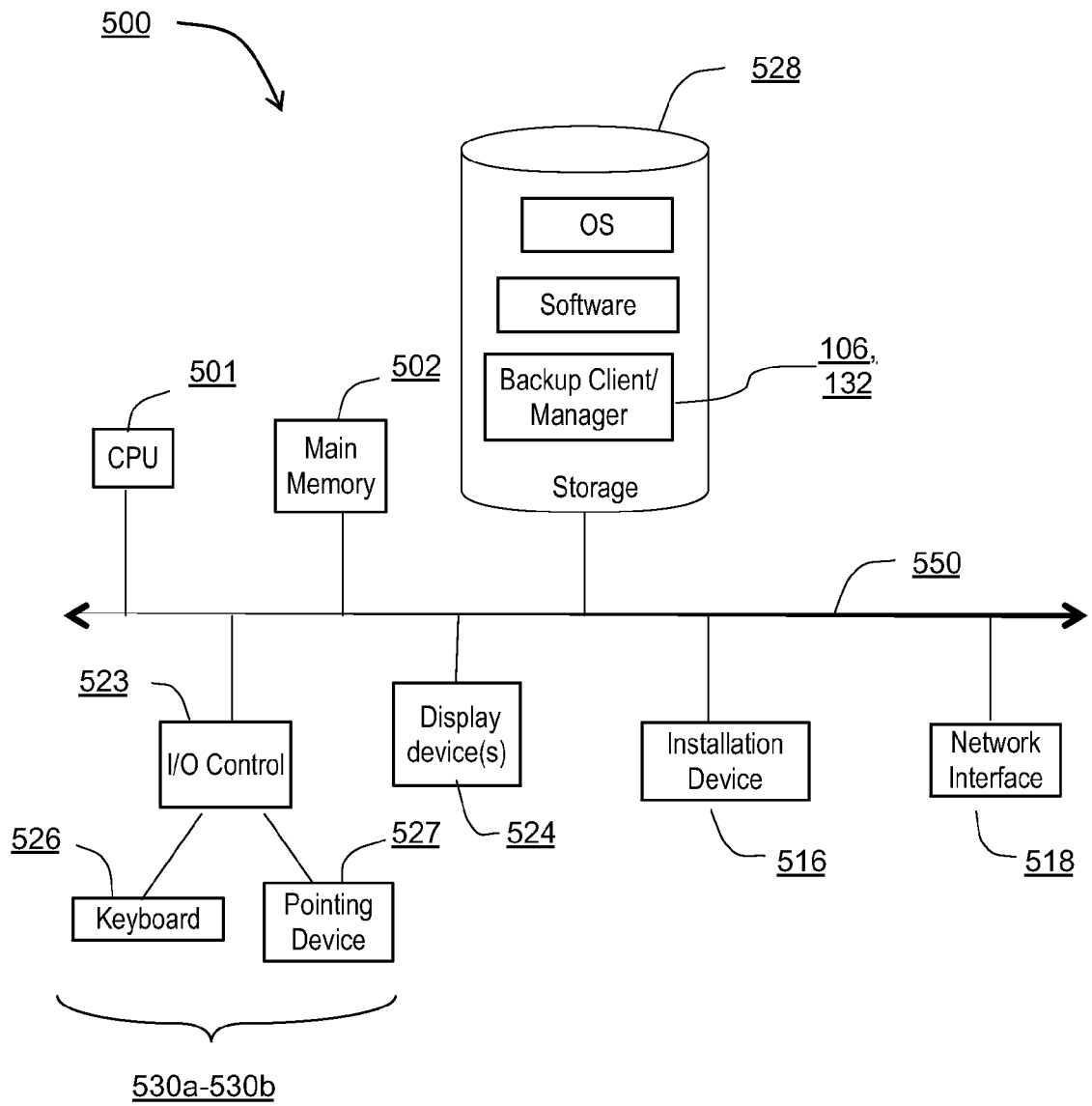
FIG. 5 is a block diagram of an exemplary computing device useful for practicing the methods and systems described herein.

FIG. 5 is a block diagram of an exemplary computing device useful for practicing the methods and systems described herein. The various devices 100, 130 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. A computing device 500 may include a central processing unit 501; a main memory unit 502; a visual display device 524; one or more input/output devices 530a-530b (generally referred to using reference numeral 530), such as a keyboard 526, which may be a virtual keyboard or a physical keyboard, and/or a pointing device 527, such as a mouse, touchpad, or capacitive or resistive single- or multi-touch input device; and a cache memory 540 in communication with the central processing unit 501.

The central processing unit 501 is any logic circuitry that responds to and processes instructions fetched from the main memory unit 502 and/or storage 528. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 502 may be one or more memory chips capable of storing data and allowing any storage location to be directly accessed by the microprocessor 501, such as random access memory (RAM) of any type. In some embodiments, main memory unit 502 may include cache memory or other types of memory.

The computing device 500 may support any suitable installation device 516, such as a floppy disk drive, a CD-ROM drive, a CD-R/RW drive, a DVD-ROM drive, tape drives of various formats, USB/Flash devices, a hard-drive or any other device suitable for installing software and programs such as any client agent 520, or portion thereof. The computing device 500 may further comprise a storage device 528, such as one or more hard disk drives or redundant arrays of independent disks, for storing an operating system and other related software, and for storing application software programs such as any program related to the client agent 520.

Furthermore, the computing device 500 may include a network interface 518 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 518 may comprise a built-in network adapter, network interface card, PCMCIA network card, card bus network adapter, wireless network adapter, USB network adapter, cellular modem or any other device suitable for interfacing the computing device 500 to any type of network capable of communication and performing the operations described herein.

A wide variety of I/O devices 530a-530n may be present in the computing device 500. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 530 may be controlled by an I/O controller 523 as shown in FIG. 5. The I/O controller may control one or more I/O devices such as a keyboard 526 and a pointing device 527, e.g., a mouse, optical pen, or multi-touch screen. Furthermore, an I/O device may also provide storage 528 and/or an installation medium 516 for the computing device 500. The computing device 500 may provide USB connections to receive handheld USB storage devices such as the USB Flash Drive line of devices manufactured by Twintech Industry, Inc. of Los Alamitos, Calif.

The computing device 500 may comprise or be connected to multiple display devices 524a-524n, which each may be of the same or different type and/or form. As such, any of the I/O devices 530a-530n and/or the I/O controller 523 may comprise any type and/or form of suitable hardware, software embodied on a tangible medium, or combination of hardware and software to support, enable or provide for the connection and use of multiple display devices 524a-524n by the computing device 500. For example, the computing device 500 may include any type and/or form of video adapter, video card, driver, and/or library to interface, communicate, connect or otherwise use the display devices 524a-524n. A video adapter may comprise multiple connectors to interface to multiple display devices 524a-524n. The computing device 500 may include multiple video adapters, with each video adapter connected to one or more of the display devices 524a-524n. Any portion of the operating system of the computing device 500 may be configured for using multiple displays 524a-524n. Additionally, one or more of the display devices 524a-524n may be provided by one or more other computing devices, such as computing devices 500a and 500b connected to the computing device 500, for example, via a network. These embodiments may include any type of software embodied on a tangible medium designed and constructed to use another computer's display device as a second display device 524a for the computing device 500. One ordinarily skilled in the art will recognize and appreciate the various ways and embodiments that a computing device 500 may be configured to have multiple display devices 524a-524n.

A computing device 500 of the sort depicted in FIG. 5 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 500 may have different processors, operating systems, and input devices consistent with the device. For example, in one embodiment, the computer 500 is an Apple iPhone or Motorola Droid smart phone, or an Apple iPad or Samsung Galaxy Tab tablet computer, incorporating multi-input touch screens. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

What is claimed:

1. A method for reliable backup of media, comprising:
    capturing, by a device, a first item of media at a first resolution;
    determining, by the device, that a parameter of a first network connection between the device and a second device is below a predetermined threshold;
    transcoding, by the device, the first item of media to a second, lower resolution, responsive to the determination that the parameter of the first network connection is below the predetermined threshold;
    transmitting, by the device, the transcoded first item of media at the second, lower resolution, to the second device for storage via the first network connection;

subsequently determining, by the device, that the parameter of a second network connection between the device and the second device is equal to or above the predetermined threshold;

beginning transmitting, by the device, the first item of media at the first resolution via the second network connection responsive to the determination that the parameter of the second network connection is equal to or above the predetermined threshold;

capturing, by the device, a second item of media at the first resolution, during transmission of the first item of media at the first resolution;

determining that more than a predetermined amount of data of the first item of media remains to be transferred, responsive to capturing the second item of media;

interrupting, by the device, transmission of the first item of media at the first resolution, responsive to the determination that more than the predetermined amount of data of the first item of media remains to be transferred;

transcoding, by the device, the second item of media to the second, lower resolution;

transmitting, by the device, the second item of media at the second, lower resolution, to the second device for storage; and resuming transmission of the first item of media at the first resolution to the second device, responsive to completion of transmission of the second item of media at the second, lower resolution, to the second device.

2. The method of claim 1, wherein the first network connection comprises a cellular connection, and wherein the second network connection comprises a wired data connection or a WiFi connection.

3. The method of claim 1, wherein the parameter is a bandwidth of the connection, a packet loss rate of the connection, or a remaining amount of data that may be transferred under a monthly subscription for the connection.

4. The method of claim 1, wherein interrupting transmission of the first item of media at the first resolution further comprises initiating a third network connection to the second device for transmission of the second item of media at the second, lower resolution, the third network connection set to a higher priority than the second network connection.

5. The method of claim 1, further comprising:

identifying a connection type of the first network connection and identifying a type of the second network connection; and wherein determining that the parameter of the first network connection is below the predetermined threshold is based on the type of the first network connection, and wherein determining that the parameter of the second network connection is equal to or above the predetermined threshold is based on the type of the second network connection.

6. The method of claim 1, wherein transcoding the first item of media comprises scaling the first item of media or reducing a bit depth of the first item of media.

7. The method of claim 1, interrupting transmission of the first item of media at the first resolution further comprises reducing a transmission rate of the first item of media at the first resolution to a minimum level to keep the second network connection alive.

8. The method of claim 1, further comprising:

storing the transcoded first item of media at the second, lower resolution until successfully transmitting the first item of media at the first resolution via the second network connection; and deleting the stored transcoded first item of media responsive to the successful transmission of the first item of media at the first resolution.

9. A method for reliable backup of media, comprising:

receiving, by a device from a second device via a first network connection, a first item of media at a first resolution, the first item of media captured at a second, higher resolution and transcoded by the second device to the first resolution;

storing, by the device, the first item of media at the first resolution;

subsequently beginning receiving, by the device from the second device via a second network connection, the first item of media at the second, higher resolution;

receiving, by the device from the second device via a third network connection set to a higher priority than the second network connection, a second item of media transcoded to the first resolution, the receipt of the second item of media via the higher priority third network connection interrupting receipt of the first item of media at the second, higher resolution via the lower priority second network connection;

resuming receipt of the first item of media from the second device at the second, higher resolution, by the device, responsive to completion of receipt of the second item of media at the first resolution; and deleting, by the device, the first item of media at the first resolution, responsive to receiving the first item of media at the second, higher resolution.

10. The method of claim 9, further comprising determining that the received first item of media at the second, higher resolution is a higher-resolution version of the first item of media at the first resolution.

11. The method of claim 10, further comprising comparing metadata of the first item of media at the second, higher resolution and the first item of media at the first resolution.

12. The method of claim 10, further comprising receiving with the first item of media at the first resolution a first identifier; receiving with the first item of media at the second, higher resolution a second identifier; and comparing the first identifier and second identifier.

13. The method of claim 9, wherein a parameter of the first network connection between the device and the second device is below a predetermined threshold, and the parameter of the second network connection between the device and the second device is equal to or above the predetermined threshold.

14. A system for reliable backup of media, comprising:

a device comprising a network interface, a processor executing a transcoding engine and a backup engine, and a media capture interface capturing a first item of media at a first resolution and capturing a second item of media at the first resolution, during transmission of the first item of media at the first resolution to a second device;

wherein the transcoding engine is configured for transcoding the first item of media to a second, lower resolution, responsive to a determination that a parameter of a first network connection between the device and the second device via the network interface is below a predetermined threshold and transcoding the second item of media to the second, lower resolution, responsive to capture of the second item of media during transmission of the first item of media at the first resolution to the second device; and wherein the backup engine is configured for:
- transmitting the transcoded first item of media at the second, lower resolution, to the second device for storage via the first network connection;
- subsequently determining, that the parameter of a second network connection between the device and the second device via the network interface is equal to or above the predetermined threshold;
- beginning transmitting the first item of media at the first resolution via the second network connection responsive to the determination that the parameter of the second network connection is equal to or above the predetermined threshold;
- interrupting transmission of the first item of media at the first resolution, responsive to capturing the second item of media, by reducing a transmission rate of the second network connection from a previous rate to a minimum rate required to keep the connection alive;
- transmitting the transcoded second item of media at the second, lower resolution, to the second device for storage via a third network connection; and
- resuming transmission of the first item of media at the first resolution to the second device by increasing the transmission rate of the second network connection to the previous rate, responsive to completion of transmission of the second item of media at the second, lower resolution, to the second device.

15. The system of claim 14, wherein the first network connection comprises a cellular connection, and wherein the second network connection comprises a wired data connection or a WiFi connection.

16. The system of claim 14, wherein the parameter is a bandwidth of the connection, a packet loss rate of the connection, or a remaining amount of data that may be transferred under a monthly subscription for the connection.

17. The system of claim 14, wherein the backup engine is further configured for determining that more than a predetermined amount of data of the first item of media remains to be transferred, and interrupting transmission of the first item of media, responsive to the determination.

18. The system of claim 14, wherein the backup engine is further configured for:
- identifying a connection type of the first network connection and identifying a type of the second network connection; and
- wherein the determination that the parameter of the first network connection is below the predetermined threshold is based on the type of the first network connection, and
- wherein the determination that the parameter of the second network connection is equal to or above the predetermined threshold is based on the type of the second network connection.

19. The system of claim 14, wherein the backup engine is further configured for:
- storing the transcoded first item of media at the second, lower resolution until successfully transmitting the first item of media at the first resolution via the second network connection; and
- deleting the stored transcoded first item of media responsive to the successful transmission of the first item of media at the first resolution.

20. A method for reliable backup of media, comprising:
- capturing, by a device, a first item of media at a first resolution;
- transcoding, by the device, the first item of media to a second, lower resolution;
- transmitting, by the device, the transcoded first item of media at the second, lower resolution, to a second device for storage via a first network connection;
- beginning transmitting, by the device, the first item of media at the first resolution via a second network connection;
- capturing, by the device, a second item of media at the first resolution, during transmission of the first item of media at the first resolution;
- transcoding, by the device, the second item of media to the second, lower resolution;
- interrupting, by the device, transmission of the first item of media at the first resolution, responsive to capturing the second item of media by initiating a third network connection to the second device for transmission of the second item of media at the second, lower resolution, the third network connection set to a higher priority than the second network connection;
- transmitting, by the device via the third network connection, the second item of media at the second, lower resolution, to the second device for storage; and
- resuming transmission of the first item of media at the first resolution to the second device by terminating the third network connection, responsive to completion of transmission to the second device of the second item of media at the second, lower resolution.

* * * * *